(12) United States Patent
Kusukawa (10) Patent No.: US 11,689,007 B2
(45) Date of Patent: Jun. 27, 2023

(54) IMAGE FORMING APPARATUS

(71) Applicant: KYOCERA Document Solutions Inc., Osaka (JP)

(72) Inventor: Takashi Kusukawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 612 days.

(21) Appl. No.: 16/830,676

(22) Filed: Mar. 26, 2020

(65) Prior Publication Data

US 2020/0313414 A1 Oct. 1, 2020

(30) Foreign Application Priority Data

Mar. 29, 2019 (JP) .................................. 2019-067030

(51) Int. Cl.
*H02G 3/08* (2006.01)
*H02G 3/14* (2006.01)

(52) U.S. Cl.
CPC ............... *H02G 3/085* (2013.01); *H02G 3/14* (2013.01)

(58) Field of Classification Search
CPC H05K 7/00; H05K 7/02; H05K 7/026; H05K 5/00; H05K 5/02; H05K 5/0069; H05K 5/03; H05K 7/14; H05K 7/1401; H02G 3/08; H02G 3/081; H02G 3/14; H02G 3/085; G03G 21/1633; G03G 21/16; G03G 21/1652
USPC ..... 174/50, 520, 481, 480, 559, 53; 220/3.2, 220/3.3; 361/600, 601, 641, 659, 679.1, 361/679.2, 679.33; 439/76.1, 76.2, 949; 312/223.1, 223.2, 223.6
See application file for complete search history.

(56) References Cited

U.S. PATENT DOCUMENTS

| | | | | |
|---|---|---|---|---|
| 5,568,362 A | * | 10/1996 | Hansson | H02B 1/40 439/942 |
| 5,761,033 A | * | 6/1998 | Wilhelm | H05K 7/1429 361/679.33 |
| 6,160,703 A | * | 12/2000 | Lopez | G11B 33/128 174/544 |
| 6,373,696 B1 | * | 4/2002 | Bolognia | H05K 7/20727 361/679.33 |
| 6,381,130 B1 | * | 4/2002 | Yen | G11B 33/128 361/679.33 |

(Continued)

FOREIGN PATENT DOCUMENTS

| | | |
|---|---|---|
| CN | 101861065 | 10/2010 |
| JP | 2002311760 A | 10/2002 |

(Continued)

OTHER PUBLICATIONS

Japan Patent Office, Notice of Reasons for Refusal Issued in Application No. 2019-067030, dated Jan. 10, 2023, 8 pages.

*Primary Examiner* — Angel R Estrada
(74) *Attorney, Agent, or Firm* — Alleman Hall Creasman & Tuttle LLP (57) ABSTRACT

An image forming apparatus includes an electrical box. The electrical box has an opening for putting and removing a hard disk into and from the electrical box therethrough, a hard-disk receiving space facing the opening and receiving the hard disk, a board receiving space receiving an electrical board, and a box-shaped partition wall separating the hard-disk receiving space and the board receiving space and having formed therein an insertion hole allowing a cable to be inserted therethrough.

5 Claims, 12 Drawing Sheets

(56) References Cited

U.S. PATENT DOCUMENTS

| | | | | |
|---|---|---|---|---|
| 6,580,604 | B1 * | 6/2003 | McAnally | G11B 33/128 |
| | | | | 361/679.4 |
| 6,937,461 | B1 * | 8/2005 | Donahue, IV | H01R 13/514 |
| | | | | 174/59 |
| 6,967,837 | B2 * | 11/2005 | Shih | G06F 1/183 |
| | | | | 361/679.48 |
| 8,971,035 | B2 * | 3/2015 | Tamaki | G11B 33/124 |
| | | | | 361/679.33 |
| 9,788,463 | B2 * | 10/2017 | Ozawa | H05K 7/20754 |
| 2017/0131680 | A1 | 5/2017 | Koseki | |

FOREIGN PATENT DOCUMENTS

| | | |
|---|---|---|
| JP | 2004-347899 | 12/2004 |
| JP | 2017092261 A | 5/2017 |

* cited by examiner

Right ←——→ Left

Right ↔ Left

FIG. 5

Right ←——→ Left

IMAGE FORMING APPARATUS

CROSS-REFERENCE TO RELATED APPLICATION(S)

This application is based upon and claims the benefit of priority from Japanese Patent Application No. 2019-067030 filed on Mar. 29, 2019, the entire contents of which are incorporated herein by reference.

BACKGROUND

The technology disclosed herein relates to an image forming apparatus.

An image forming apparatus has been known which includes a hard disk. Such an image forming apparatus is configured such that the hard disk and a control board are housed in a single box and connected to each other via a connector.

SUMMARY

An aspect of the present disclosure provides an image forming apparatus including an electrical box that houses an electrical board and a hard disk. The electrical board has a connector. The hard disk is later-connectable to the connector of the electrical board via a cable.

The electrical box has an opening, a hard-disk receiving space, a board receiving space, and a partition wall. The opening is formed for putting and removing the hard disk into and from the electrical box therethrough. The hard-disk receiving space faces the opening and receives the hard disk. The board receiving space receives the electrical board. The partition wall separates the hard-disk receiving space and the board receiving space. The partition wall has formed therein an insertion hole allowing the cable to be inserted therethrough.

DETAILED DESCRIPTION

Hereinafter, an example embodiment of the present disclosure will be described in detail on the basis of the drawings. It should be understood that the technology disclosed herein is not limited to the embodiment described below.

[Overall Configuration]

Figure 1:
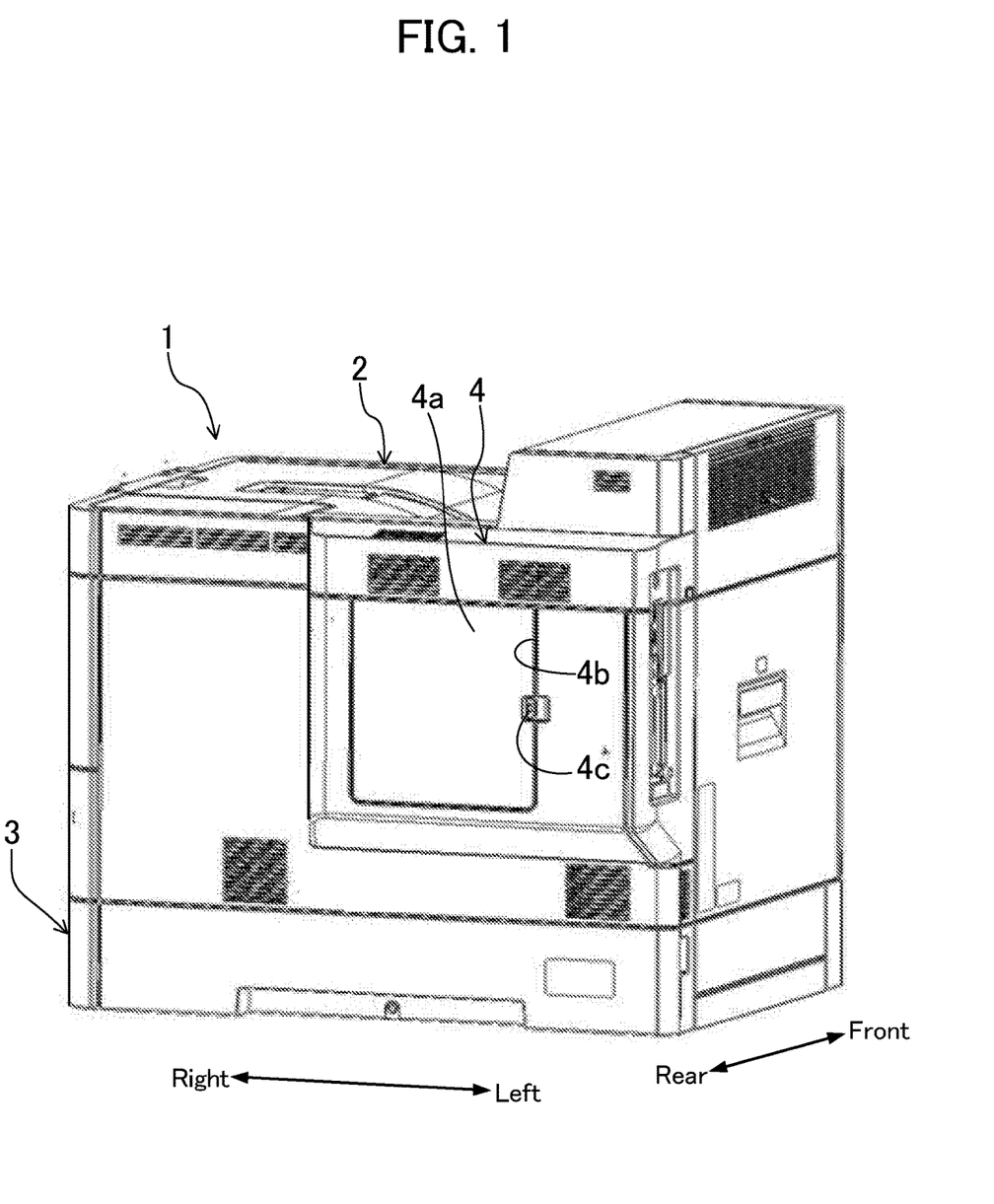
FIG. 1 is a perspective view of the appearance of an image forming apparatus according to an embodiment of the present disclosure as viewed obliquely from the rear left side.

FIG. 1 illustrates an image forming apparatus 1 according to an embodiment of the present disclosure. The image forming apparatus 1 is composed of a printer which prints image data, which is received from an external terminal or the like, on a sheet. Note that, in the description below, the terms "front" and "rear" refer to the front side and rear side of the image forming apparatus 1, respectively, and the terms "left" and "right" refer to the left side and right side of the image forming apparatus 1 as viewed from the front side thereof, respectively.

The image forming apparatus 1 includes an image forming apparatus body 2, a sheet feed cassette 3 disposed under the image forming apparatus body 2, and an electrical-board housing unit 4 provided on the rear side of the image forming apparatus body 2. The electrical-board housing unit 4 is, as descried later, configured to be able to house a hard disk 11 as an optional device in addition to electrical boards.

The image forming apparatus body 2 has therein an image forming unit (not illustrated) that prints an image corresponding to image data on a sheet. The image forming unit forms an image on a sheet fed from the sheet feed cassette 3, for example, by an electrophotographic method. That is to say, to form an image on a sheet, the image forming unit forms an electrostatic latent image corresponding to image data on a surface of a photosensitive drum, visualizes the formed electrostatic latent image as a toner image in a developing device, transfers the toner image onto the sheet, and thermally fixes the transferred toner image. Note that the method for image formation in the image forming unit is not limited to the above-described electrophotographic method and may be any other suitable method, such as an inkjet method.

[Configuration of Electrical-Board Housing Unit]

Figure 2:
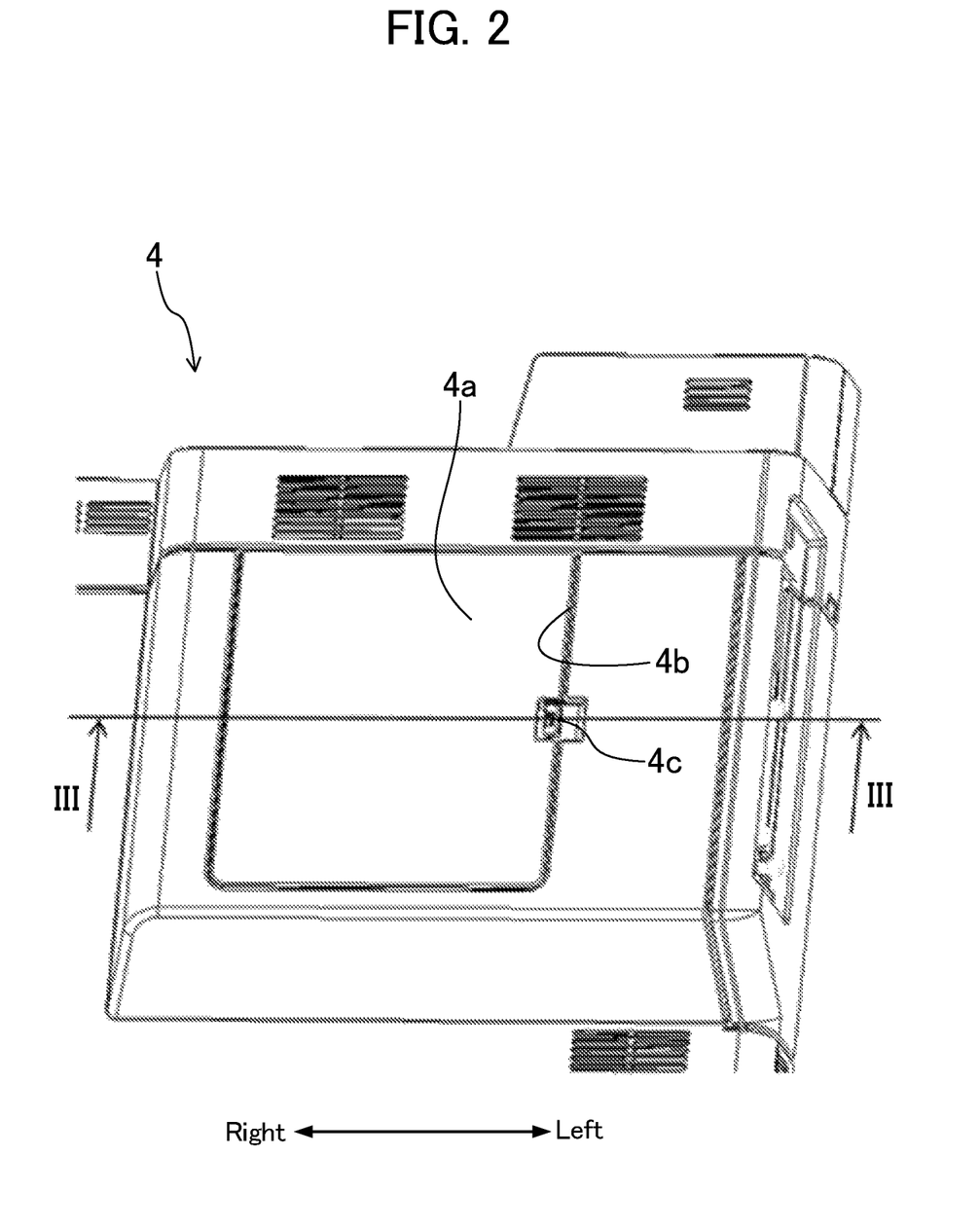
FIG. 2 is a perspective view of an electrical-board housing unit as viewed obliquely from the rear left side.

As shown in FIGS. 1 and 2, the electrical-board housing unit 4 has a flat box shape elongated in the left-right direction, and is provided on an upper right portion of a rear side surface of the image forming apparatus body 2.

Figure 3:
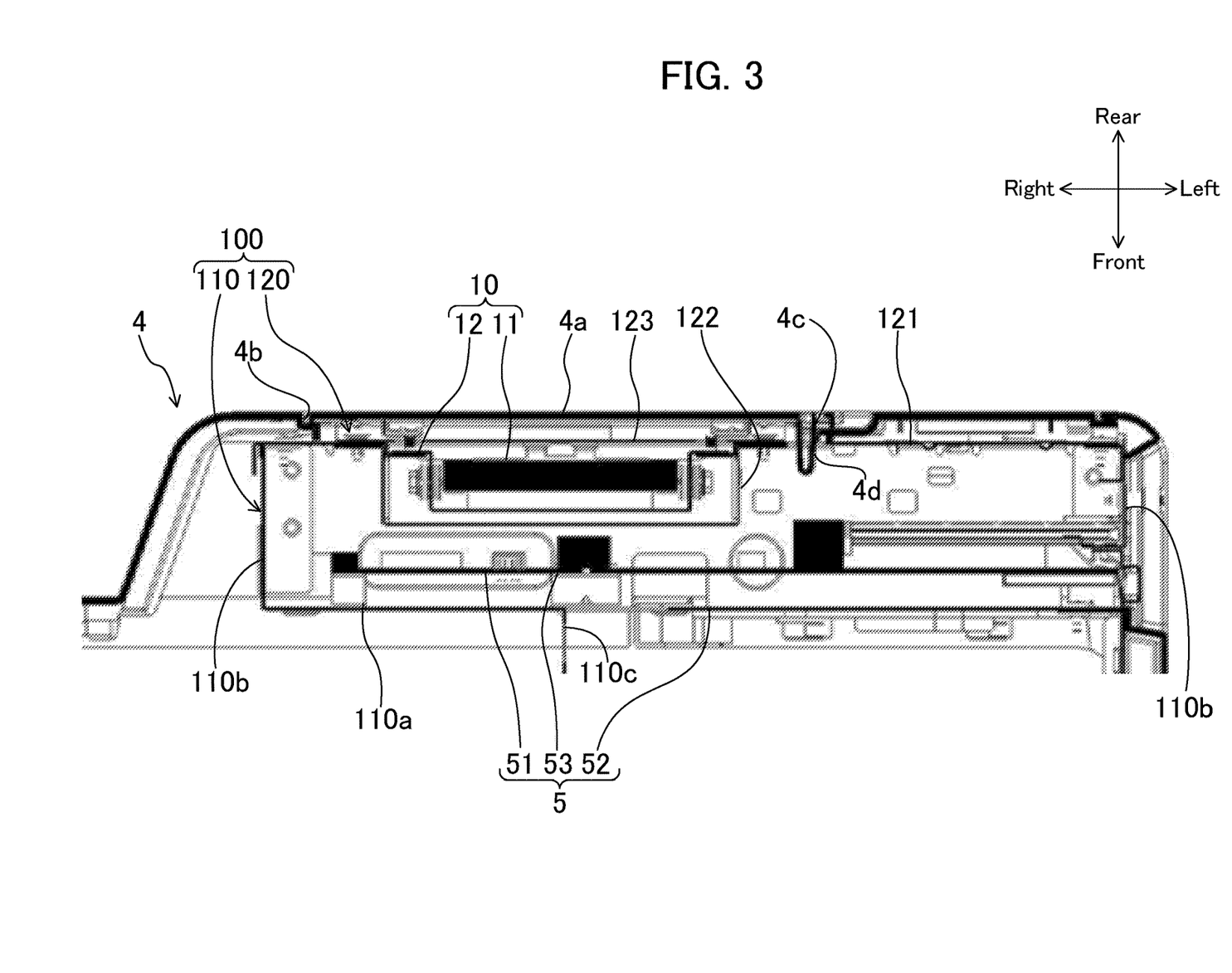
FIG. 3 is a sectional view taken along line III-III in FIG. 2.

FIG. 3 is a sectional view taken along line III-III in FIG. 2. As shown in FIG. 3, the electrical-board housing unit 4 houses a plurality of electrical boards including a control board 5. The control board 5 provides for overall control, such as image processing control and display control, of the image forming apparatus 1. The control board 5 is, as described later, housed in an electrical box 100. In the example shown in FIG. 3, the control board 5 is configured by coupling a first board part 51 and a second board part 52 at a connection 53. The connection 53 consists of, for example, mutually mating connectors that conform to a predetermined standard.

By way of example, the electrical boards other than the control board 5 include a high-voltage board and an engine board (both not illustrated). The high-voltage board supplies high voltage to, for example, constituent units (such as a photosensitive drum unit) of the image forming unit, etc. The engine board controls, for example, operation of a driving motor for a conveyance system and operation of a driving motor for a cooling fan. The electrical box 100 is arranged to overlap the rear sides of the high-voltage board and engine board. Further, the electrical-board housing unit 4 is configured to be able to house the hard disk 11 as an optional device that is retrofitted to the image forming apparatus 1.

Figure 4:
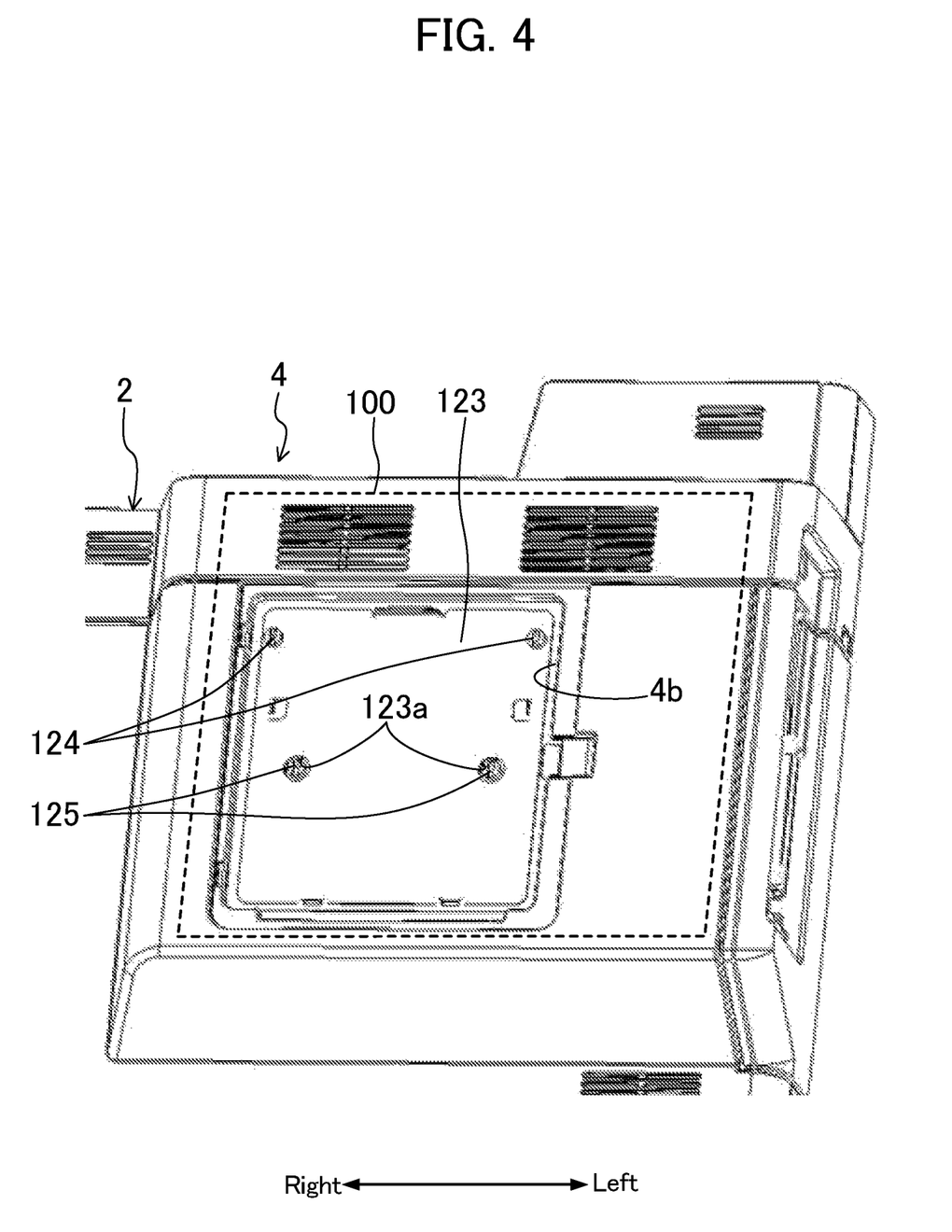
FIG. 4 is a perspective view corresponding to FIG. 2, with a resin cover removed.
Figure 5:
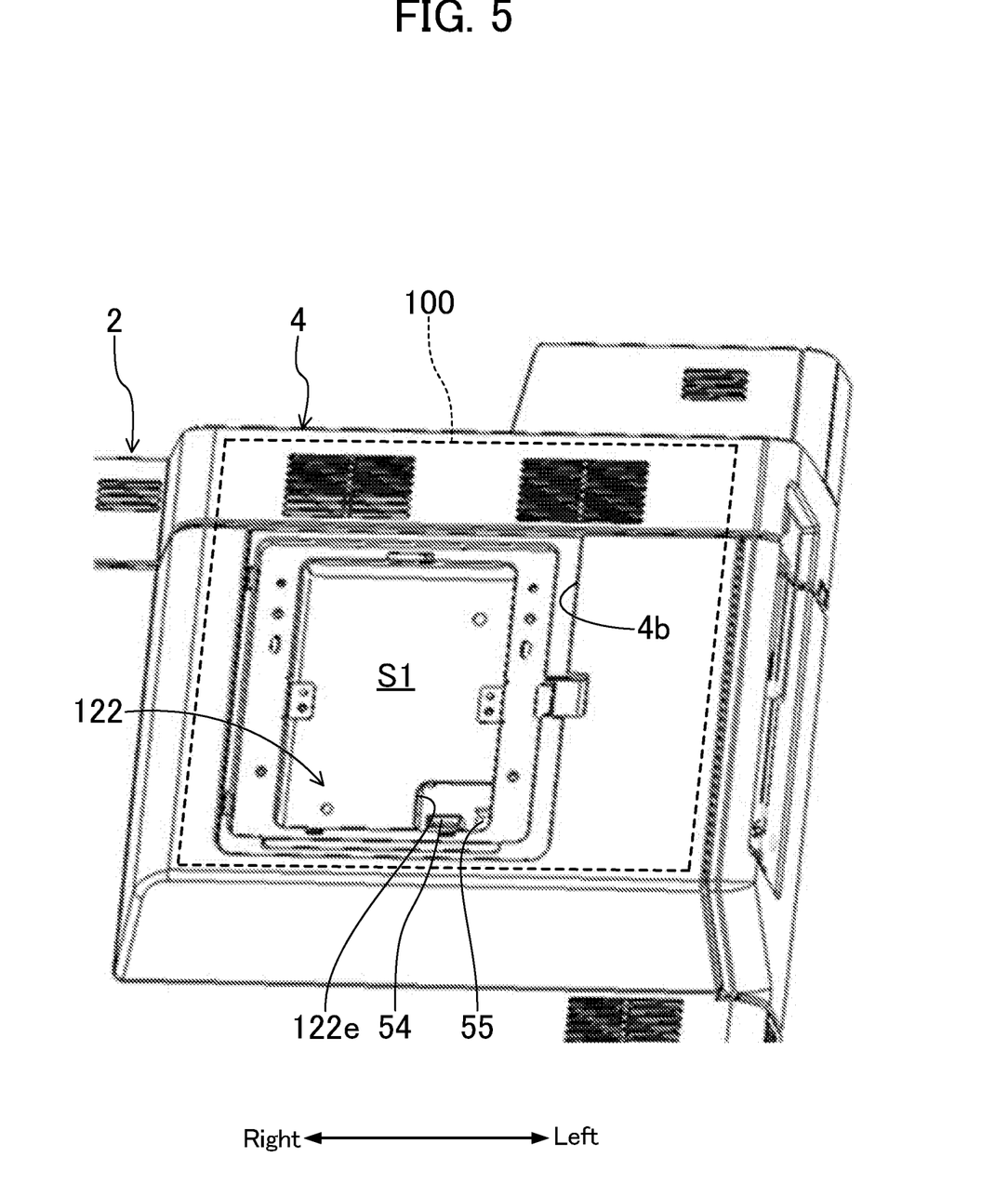
FIG. 5 is a perspective view corresponding to FIG. 4, with a sheet metal cover removed, which illustrates a state where a hard-disk receiving space does not receive an HDD assembly therein.

As shown in FIGS. 1 to 3, the electrical-board housing unit 4 has a detachable resin cover 4a attached thereto. The resin cover 4a openably and closably covers a rectangular maintenance opening 4b formed in a rear side wall of the electrical-board housing unit 4. The resin cover 4a has a handle 4c provided on one edge thereof. The operator can disengage an engagement claw 4d (illustrated in FIG. 3 only) of the resin cover 4a by pushing the handle 4c with his/her finger, so that he/she can remove the resin cover 4a. With the resin cover 4a removed, a sheet metal cover 123 provided on the electrical box 100 is exposed as shown in FIG. 4. The operator can remove the sheet metal cover 123 by loosening screws 124, so that he/she can access a hard-disk receiving space S1 inside the electrical box 100 as shown in FIG. 5.

[Configuration of Hard Disk]

Figure 6:
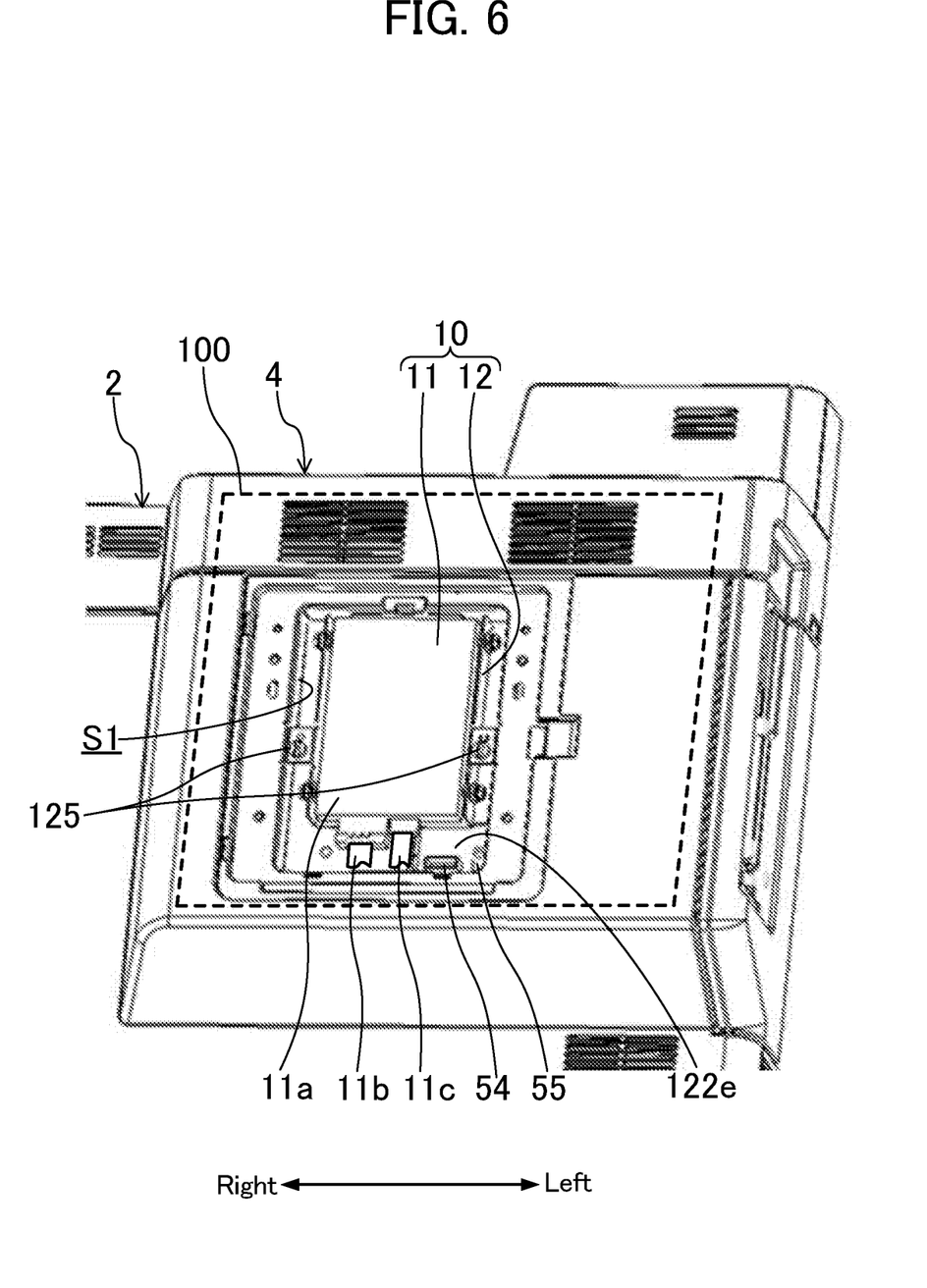
FIG. 6 is a perspective view corresponding to FIG. 5, which illustrates a state where the hard-disk receiving space receives the HDD assembly therein.

FIG. 6 illustrates a state where the hard disk 11 is installed in the hard-disk receiving space S1.

The hard disk 11 has a hard disk body 11a having a flat, rectangular parallelepiped shape in appearance, a first cable 11b, and a second cable 11c. The first cable 11b and the second cable 11c are connected to one end surface in a longitudinal direction of the hard disk body 11a. The first cable 11b and the second cable 11c may be connected and fixed to the hard disk body 11a or may be provided as separate parts which are detachably connected to the hard disk body 11a via connectors.

The first cable 11b has a mating connector (not illustrated) attached to an end thereof opposite to the end connected to hard disk body 11a, and the mating connector mates a first connector 54 (see FIGS. 6 and 12) provided on the control board 5. The second cable 11c has a mating connector (not illustrated) attached to an end thereof opposite to the end connected to the hard disk body 11a, the mating connector mates a second connector 55 provided on the control board 5. The first and second cables 11b and 11c are each composed of a cable conforming to the SCSI standard or the SATA standard. The first and second connectors 54 and 55 are composed of connectors conforming to the standards of the first and second cables 11b and 11c, respectively.

The hard disk 11 is received in the hard-disk receiving space S1 in a state of being held by a holding member 12 and thereby forming a hard disk assembly (hereinafter referred to as "HDD assembly") 10.

Figure 7:
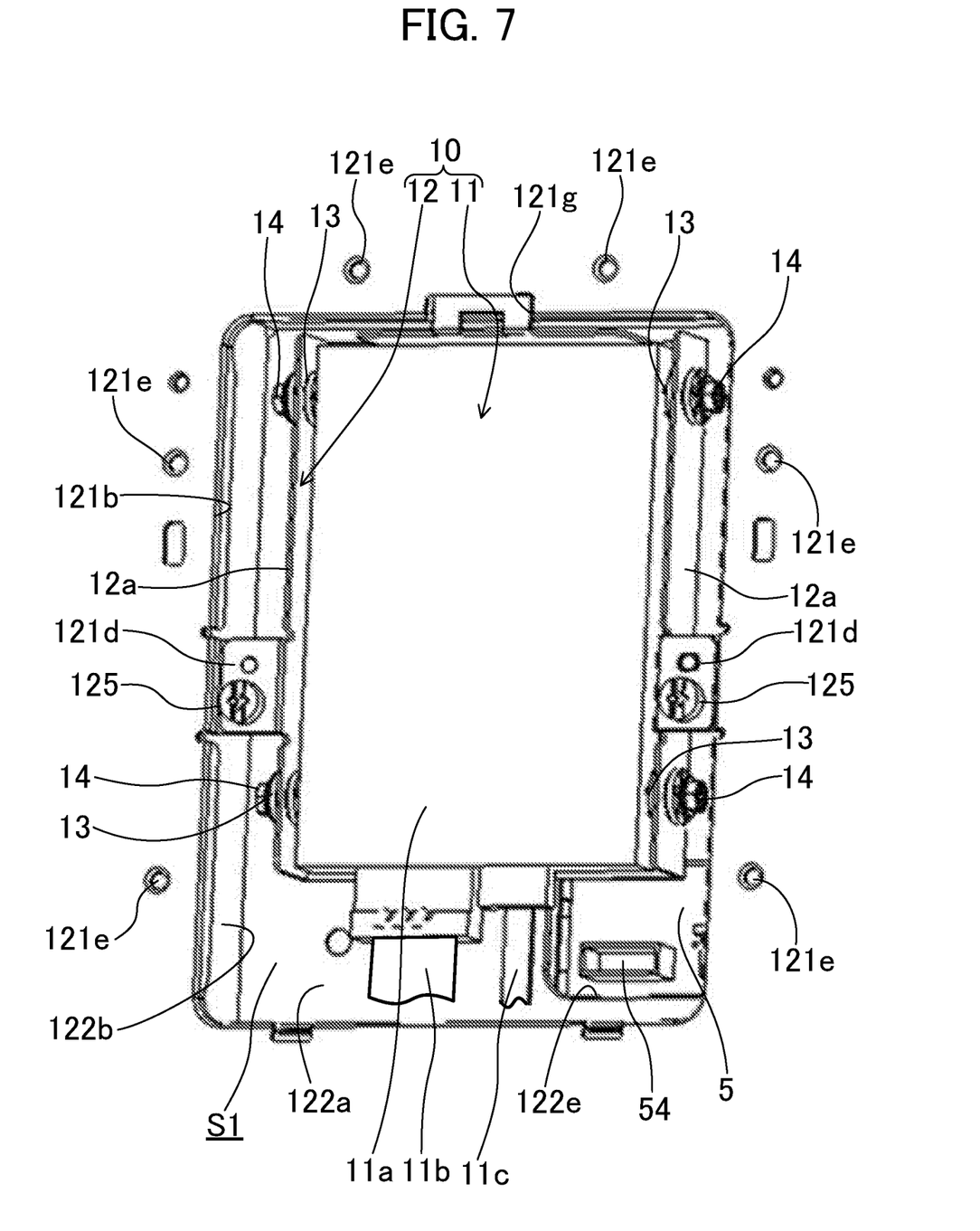
FIG. 7 is an enlarged view of the HDD assembly received in the hard-disk receiving space.

As shown in FIG. 7, the holding member 12 is formed by bending a sheet metal member into a square U-shape. The hard disk 11 is disposed between a pair of opposed plates 12a of the holding member 12. Each opposed plate 12a has two attachment holes formed therein which penetrate in a thickness direction of the opposed plate 12a. Each attachment hole has a ring-shaped vibration isolation member 13 inserted therein, and an attachment screw 14 is inserted through the vibration isolation member 13. The attachment screws 14 are screwed in screw holes formed in side end surfaces of the hard disk 11, so that the hard disk 11 is elastically supported with respect to the pair of opposed plates 12a with the vibration isolation members 13 interposed therebetween. Thus, transmission of vibration between the hard disk 11 and the image forming apparatus body 2 is inhibited by the vibration isolation members 13.

[Configuration of Electrical Box]

Figure 8:
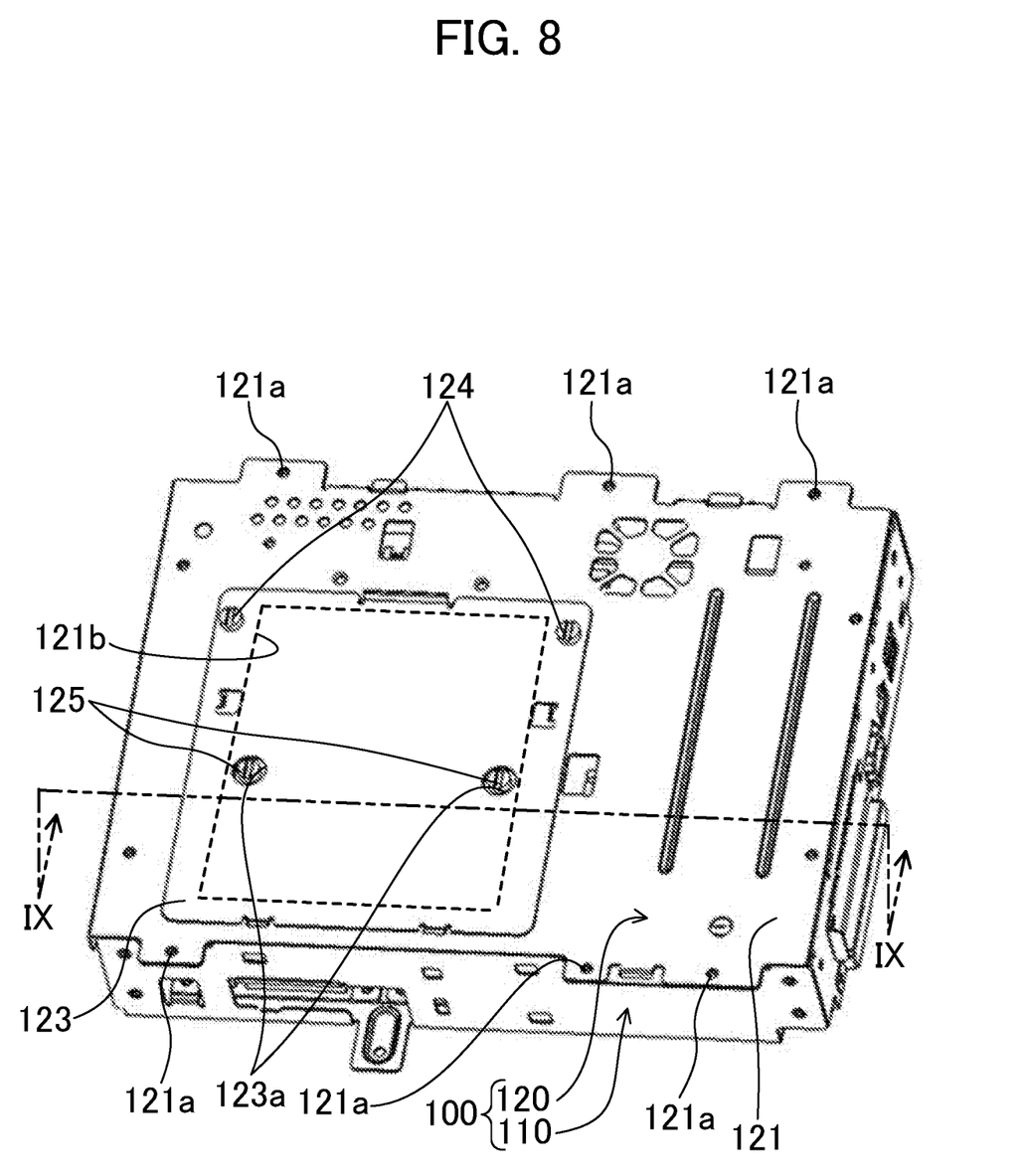
FIG. 8 is a perspective view of the appearance of an electrical box.
Figure 9:
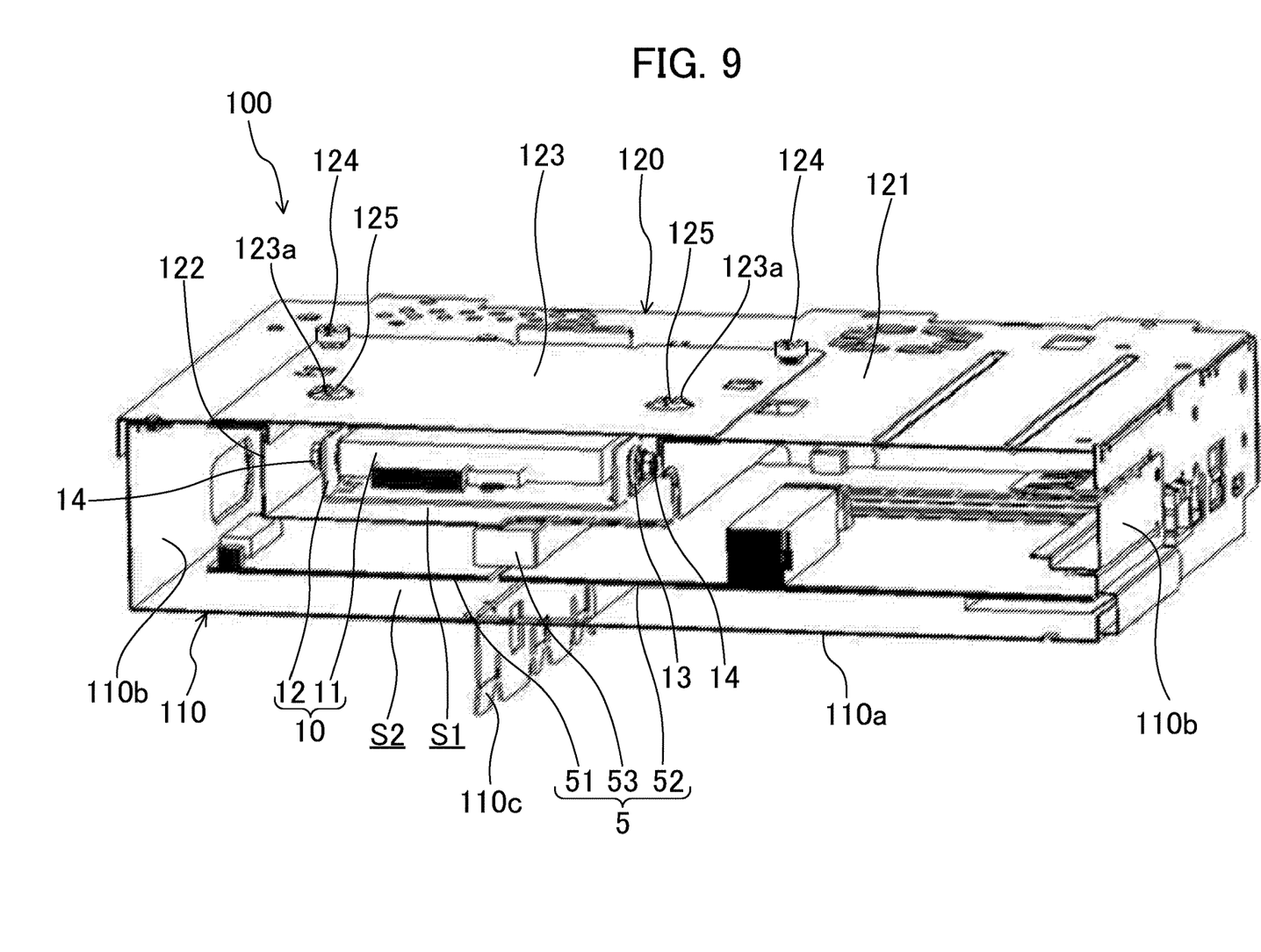
FIG. 9 is a model diagram illustrating the electrical box shown in FIG. 8 as cut along line IX-IX in FIG. 8.

As shown in FIGS. 8 and 9, the electrical box 100 is made of a sheet metal and has a flat, rectangular box shape. The electrical box 100 has a box body 110 and a lid member 120. The space inside the box body 110 is partitioned into the hard-disk receiving space S1 receiving the hard disk 11 and a board receiving space S2 receiving the control board 5.

The box body 110 is a bottomed box-shaped member having one open side, which is formed, for example, by bending a single metal plate. As shown in FIG. 9, the box body 110 has a rectangular base plate 110a and four side plates 110b respectively erected from edges of the base plate 110a. The control board 5 is mounted on an upper surface of the base plate 110a. Note that a lower surface of the base plate 110a has a positioning plate 110c formed thereon that protrudes from the lower surface of the base plate 110a and is used to mount the electrical box 100 to a back frame of the image forming apparatus body 2.

[Details of Lid Member of Electrical Box]

Figure 10:
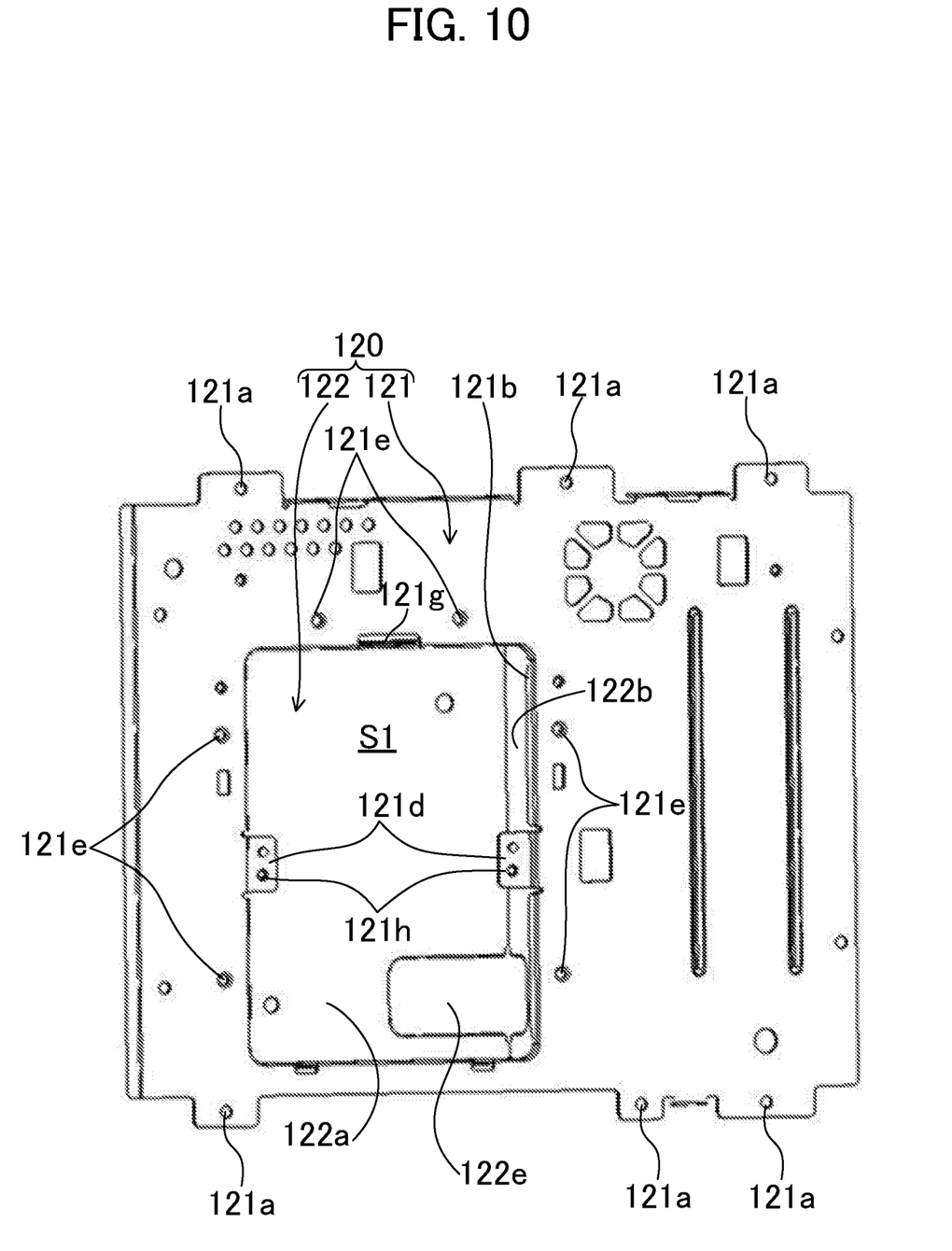
FIG. 10 is a perspective view of the appearance of a lid member.
Figure 11:
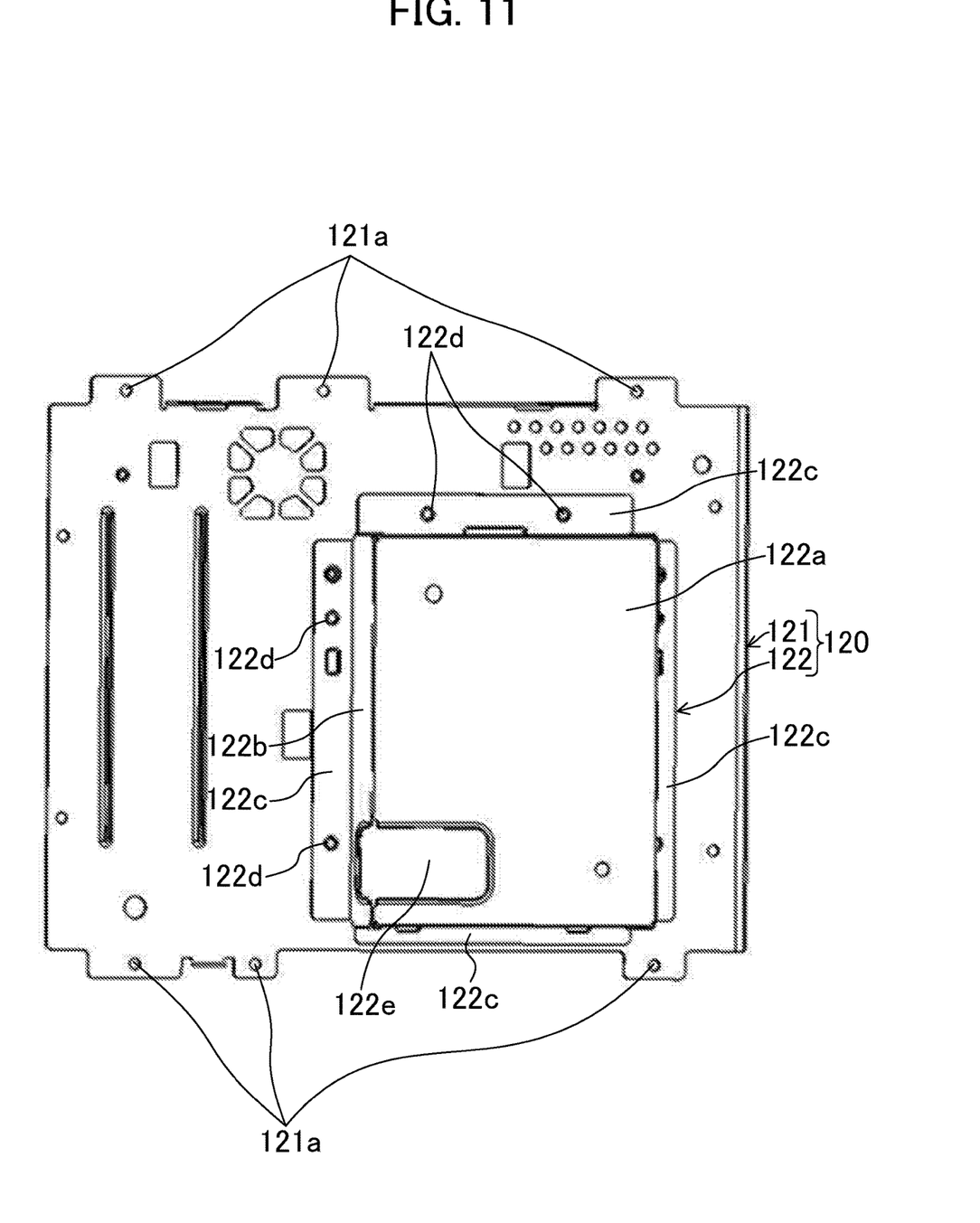
FIG. 11 is a perspective view of the appearance of the lid member as viewed from the back side thereof.

Next, the configuration of the lid member 120 of the electrical box 100 is described with reference to FIGS. 10 and 11.

The lid member 120 has a lid body 121 having an outer peripheral shape corresponding to the open end of the box body 110, and a box-shaped partition wall 122 (example of partition wall) attached to the lid body 121. The lid body 121 has a plurality of attachment holes 121a and is fixed to the box body 110 by screws inserted through the attachment holes 121a.

The lid body 121 has a rectangular opening 121b formed therein that faces the hard-disk receiving space S1 so as to put and remove the hard disk 11 into and from the hard-disk receiving space S1. A pair of opposed edges of the opening 121b each have a rectangular, plate-shaped attachment seat portion 121d formed thereon which protrudes inward of the opening 121b. The attachment seat portions 121d are formed for the purpose of fixing the above-described HDD assembly 10. Each attachment seat portion 121d has a screw hole 121h formed therein. Further, one of another pair of edges of the opening 121b that are perpendicular to the pair of opposed edges having the attachments seat portions 121d formed thereon has a concave attachment seat portion 121g for the HDD assembly 10 formed thereon. As shown in FIG. 7, the HDD assembly 10 is fixed by a pair of screws 125 in a state of being supported at three locations in total, i.e., supported by the attachment seat portions 121d and 121g. The sheet metal cover 123 (see FIG. 8) for closing the opening 121b has a pair of relief holes 123a formed therein for preventing interference with heads of the screws 125.

The box-shaped partition wall 122 is formed in a bottomed box shape having one open side. The box-shaped partition wall 122 is arranged such that the open end thereof substantially coincides with the periphery of the opening 121b (see FIGS. 10 and 11). The box-shaped partition wall 122 separates the hard-disk receiving space S1 and the board receiving space S2.

Specifically, the box-shaped partition wall 122 has a rectangular base plate 122a and four side walls 122b (only one shown in FIG. 10) respectively erected from edges of the base plate 122a. As shown in FIG. 11, a distal end of each side wall 122b has an attachment flange 122c formed thereon which is bent perpendicularly from the side wall 122b. Each attachment flange 122c has two swaging cylinders 122d formed thereon which are formed by stamping. The swaging cylinders 122d are crushed after being respectively inserted through swaging holes 121e (see FIG. 10)

formed in the lid body 121. Thus, the attachment flanges 122c are fixed by swaging to the lid body 121.

The base plate 122a of the box-shaped partition wall 122 has an insertion hole 122e formed therein. The first and second cables 11b and 11c connecting the hard disk 11 to the control board 5 are inserted through the insertion hole 122e. The insertion hole 122e is formed at a lower right corner of the base plate 122a of the box-shaped partition wall 122 in FIG. 12. Edges of the insertion hole 122e are bent 180° toward the box inside so that the insertion hole 122e has rounded edges.

Figure 12:
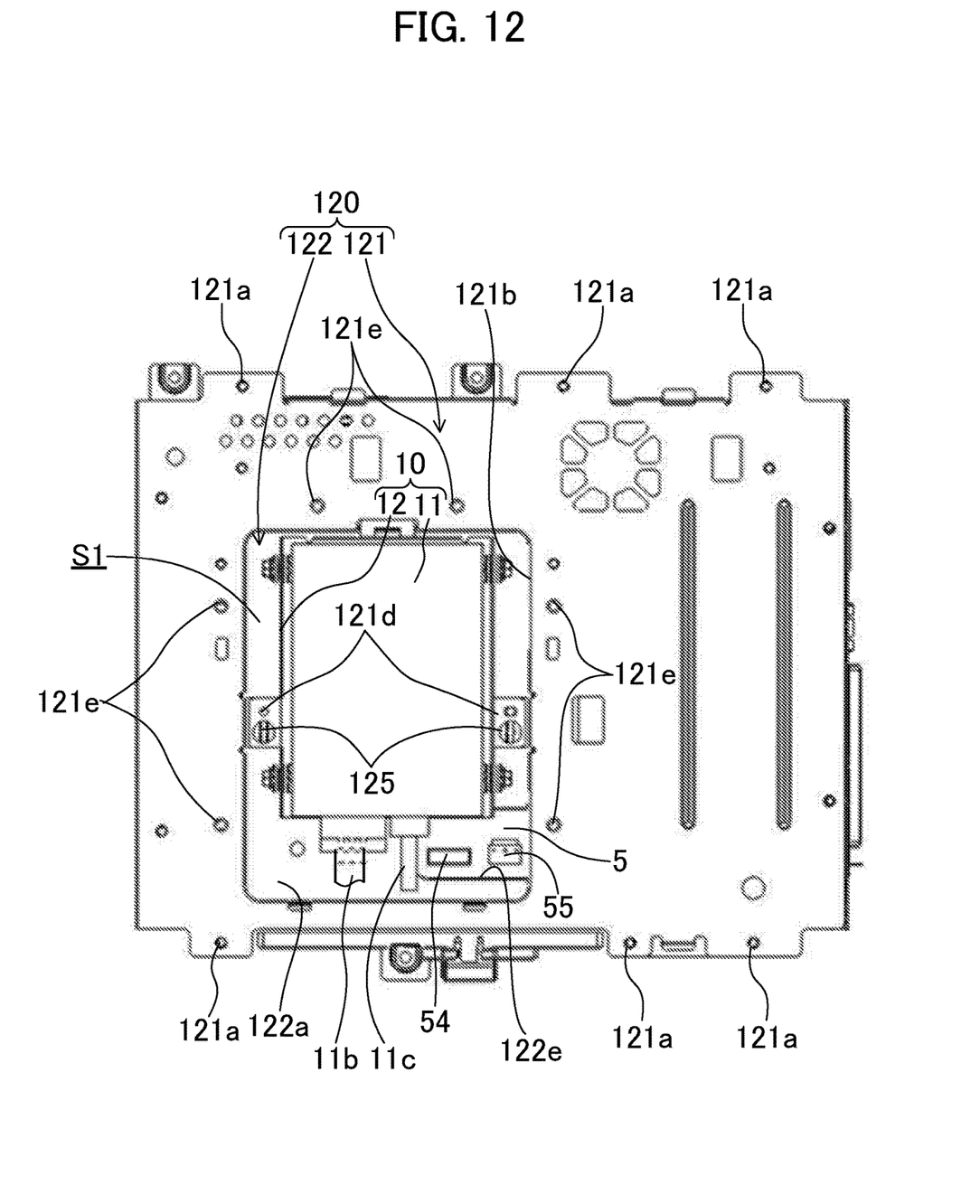
FIG. 12 is a plan view illustrating a state where the HDD assembly is received in the hard-disk receiving space of the electrical box.

As shown in FIG. 12, the insertion hole 122e is exposed below the hard disk 11 received in the hard-disk receiving space S1. The insertion hole 122e is composed of a substantially rectangular hole elongated in the lateral direction. The first and second connectors 54 and 55 provided on the control board 5 are located inside the periphery of the insertion hole 122e as viewed in the direction in which the insertion hole 122e penetrates (the direction perpendicular to the surface of the drawing sheet of FIG. 12). The directions in which the mating connectors are inserted in the first and second connectors 54 and 55 are coincident with the direction in which the insertion hole 122e penetrates.

[Operational Effects]

In this embodiment, as described above, the image forming apparatus 1 includes the electrical box 100 housing the control board 5 having the first connector 54 and the second connector 55. The electrical box 100 is configured to be able to house the hard disk 11 that is connected later to the control board 5 via the first cable 11b and the second cable 11c.

The electrical box 100 has the opening 121b through which the hard disk 11 is put into and removed from the electrical box 100, the hard-disk receiving space S1 (see FIG. 9) facing the opening 121b and receiving the hard disk 11, the board receiving space S2 receiving the control board 5, and the box-shaped partition wall 122 separating the hard-disk receiving space S1 and the board receiving space S2. The box-shaped partition wall 122 has the insertion hole 122e formed therein through which the first and second cables 11b and 11c connecting the hard disk 11 to the control board 5 are inserted.

With this configuration, since the hard-disk receiving space S1 and the board receiving space S2 are separated by the box-shaped partition wall 122, the operator is prevented from unintentionally touching the control board 5 when additionally installing the hard disk 11 in the hard-disk receiving space S1.

Further, in this embodiment, the electrical box 100 has the box body 110 having one open side, and the lid member 120 closing the open side of the box body 110. The aforementioned opening 121d is formed in the lid member 120 and the box-shaped partition wall 122 is provided on the lid member 120.

With this configuration, since the box-shaped partition wall 122 is provided on the lid member 120, the electrical box 100 can be easily assembled as compared with the case where the box-shaped partition wall 122 is provided separately from the lid member 120. Further, when the operator needs to demount the control board 5 for maintenance or due to breakdown, he/she can remove the hard disk 11 (HDD assembly 10) simultaneously with removal of the lid member 120, which facilitates the operation.

Further, in this embodiment, the first and second connectors 54 and 55 provided on the control board 5 are located inside the periphery of the insertion hole 122e formed in the base plate 122a of the box-shaped partition wall 122 as viewed in the direction in which the insertion hole 122e penetrates.

This configuration allows the connectors of the first and second cables 11b and 11c to be easily inserted into the first and second connectors 54 and 55 provided on the control board 5 through the insertion hole 122e in order to install the hard disk 11. Further, since the insertion hole 122e is formed in a small size at a corner of the box-shaped partition wall 122, the operator is prevented from unintentionally touching the control board 5 with his/her hand through the insertion hole 122e.

Furthermore, in this embodiment, the directions in which the mating connectors (not illustrated) are inserted in the first and second connectors 54 and 55 provided on the control board 5 are coincident with the direction in which the insertion hole 122e penetrates.

This configuration further facilitates the insertion and pull-out of the mating connectors with respect to the first and second connectors 54 and 55 provided on the control board 5.

OTHER EMBODIMENTS

The technology disclosed herein may be implemented with the configurations described below in the above-described embodiment.

Namely, in the above-described embodiment, the first and second connectors 54 and 55 provided on the control board 5 are located inside the periphery of the insertion hole 122e as viewed in the direction in which the insertion hole 122e penetrates. However, the present disclosure is not limited thereto, and they may be located, for example, outside and near the periphery of the insertion hole 122e. That is to say, the first and second connectors 54 and 55 can be positioned within an area which the operator can access through the insertion hole 122e.

Further, in the above-described embodiment, the control board 5 has two connectors, i.e., the first and second connectors 54 and 55, provided thereon. However, the present disclosure is not limited thereto, and the control board 5 may have three or more connectors provided thereon or may have only one connector provided thereon.

Further, in the above-described embodiment, the lid body 121 and the box-shaped partition wall 122 are formed as separate members. However, the present disclosure is not limited thereto, and the box-shaped partition wall 122 may be integrally formed on the lid body 121.

Furthermore, in the above-described embodiment, an example configuration is described in which the image forming apparatus 1 is composed of a printer. However, the present disclosure is not limited thereto, and the image forming apparatus 1 may be a copying machine, a facsimile, a multifunction peripheral (MFP), etc.

What is claimed is:

1. An image forming apparatus comprising:
an electrical box configured to house an electrical board having a connector and house a hard disk later-connectable to the connector of the electrical board via a cable, wherein
the electrical box has: an opening for putting and removing the hard disk into and from the electrical box therethrough; a hard-disk receiving space facing the opening and receiving the hard disk; a board receiving space receiving the electrical board; and a partition wall separating the hard-disk receiving space and the board receiving space and having formed therein an insertion hole allowing the cable to be inserted therethrough, the electrical box has a box body having one open side, and a lid member closing the one open side of the box body, the opening is formed in the lid member, and the partition wall and the hard disk are attached to the lid member.

2. The image forming apparatus of claim 1, wherein the connector of the electrical board is located inside a periphery of the insertion hole or outside and near the periphery of the insertion hole as viewed in a direction in which the insertion hole penetrates.

3. The image forming apparatus of claim 1, wherein a direction in which a mating connector is inserted in the connector of the electrical board is coincident with a direction in which the insertion hole penetrates.

4. The image forming apparatus of claim 1, wherein the partition wall is formed in a shape of a box that has a bottom and is opened on a side of the opening.

5. The image forming apparatus of claim 1, further comprising a cover that is attached to the lid member to close the opening, wherein removing the cover allows access to the hard-disk receiving space.

* * * * *